(12) United States Patent
Ganapam et al.

(10) Patent No.: US 8,266,221 B2
(45) Date of Patent: Sep. 11, 2012

(54) TECHNIQUE FOR DATA MANAGEMENT IN A DISTRIBUTED ENVIRONMENT

(75) Inventors: Ashok Ganapam, Kerala (IN); Ramprasadh Kothandaraman, Karnataka (IN); Hans-Martin Ludwig, Wiesloch (DE)

(73) Assignee: SAP AG, Walldorf (DE)

( * ) Notice: Subject to any disclaimer, the term of this patent is extended or adjusted under 35 U.S.C. 154(b) by 1639 days.

(21) Appl. No.: 11/617,794

(22) Filed: Dec. 29, 2006

(65) Prior Publication Data

US 2008/0162596 A1    Jul. 3, 2008

(51) Int. Cl.
*G06F 15/16* (2006.01)
(52) U.S. Cl. .................. 709/206; 709/223; 705/26.1
(58) Field of Classification Search .................. 709/205, 709/206, 207, 223; 705/26.1, 26.8, 27.1, 705/27.2, 26.64, 14.23, 500
See application file for complete search history.

(56) References Cited

U.S. PATENT DOCUMENTS

| | | | |
|---|---|---|---|
| 6,493,826 B1 * | 12/2002 | Schofield et al. | 726/22 |
| 7,657,575 B2 * | 2/2010 | Eberlein et al. | 707/999.201 |
| 2002/0126135 A1 * | 9/2002 | Ball et al. | 345/600 |
| 2002/0161835 A1 * | 10/2002 | Ball et al. | 709/203 |
| 2007/0043681 A1 * | 2/2007 | Morgan et al. | 705/67 |
| 2008/0263154 A1 * | 10/2008 | Van Datta | 709/205 |
| 2009/0094050 A1 * | 4/2009 | Yoshida et al. | 705/1 |
| 2010/0114783 A1 * | 5/2010 | Spolar | 705/80 |
| 2010/0332356 A1 * | 12/2010 | Spolar | 705/27.1 |

* cited by examiner

*Primary Examiner* — Frantz Jean (57) ABSTRACT

Disclosed is a method and system for receiving a first message and creating a before image of the first message by comparing the first message with a second message stored in a message database. An actual message to be updated in a target device is identified by combining a transaction data and the before image of the first message.

23 Claims, 6 Drawing Sheets

TECHNIQUE FOR DATA MANAGEMENT IN A DISTRIBUTED ENVIRONMENT

FIELD OF THE INVENTION

The invention relates to the field of data management in a distributed environment where data is sent to multiple destinations.

BACKGROUND OF THE INVENTION

Data management is a very important aspect in a distributed environment where data is obtained from more than one source and is sent to more than one target device. A server receiving the data processes the data and sends the processed data to a target device. The server may have to ensure that right data is sent to a right target device.

Consider a message in a source device having data of a sales order such as sales order identification (ID), customer name, and a product. The message having data of the sales order with values order ID 1, Ross, water is updated to have the values order ID 1, Ross, alcohol. The source device sends the message to the server to update the sales order in a target device. The server receives the message from the source device, processes the message and determines that the sales order with order ID 1 has a new product, alcohol. The server constructs a target message with an instruction to add the product, alcohol to the sales order with order ID 1 in the target device and sends the target message to the target device. The target message results in adding the product, alcohol to the sales order with order ID 1 in the target device. The target message may not have the instruction to delete the product, water from sales order with order ID 1 in the target device. As a result, now the sales order with order ID 1 in the target device has both the products water and alcohol whereas the sales order with order ID 1 in the source device has the product alcohol only. This leads to inconsistency of data in the target device with respect to the source device. Also, the target device may result in having wrong data. Thus, the target message sent to the target device may be incomplete as the target message may not have the instruction to delete the product, water from the sales order with order ID1 in the target device. Furthermore, data management and distribution becomes more complex when messages are received from more than one source and are sent to more than one target device.

SUMMARY OF THE INVENTION

What is described is a method and system for receiving a first message and creating a before image of the first message by comparing the first message with a second message stored in a message database. An actual message to be updated in a target device is identified by combining a transaction data and the before image of the first message.

The transaction data may be created by comparing the first message with the second message. The actual message is sent to a distribution engine which identifies the target device to be updated with the actual message.

DETAILED DESCRIPTION

An actual message to be updated in a target device is identified by combining a transaction data and a before image of a first message which is received at a server from a source device. Identifying the actual message involves creating the before image of the first message by comparing the first message with a second message stored in a message database. The transaction data may be created by comparing the first message with the second message. The actual message may be sent to a distribution engine which identifies the target device to be updated with the actual message.

Figure 1:
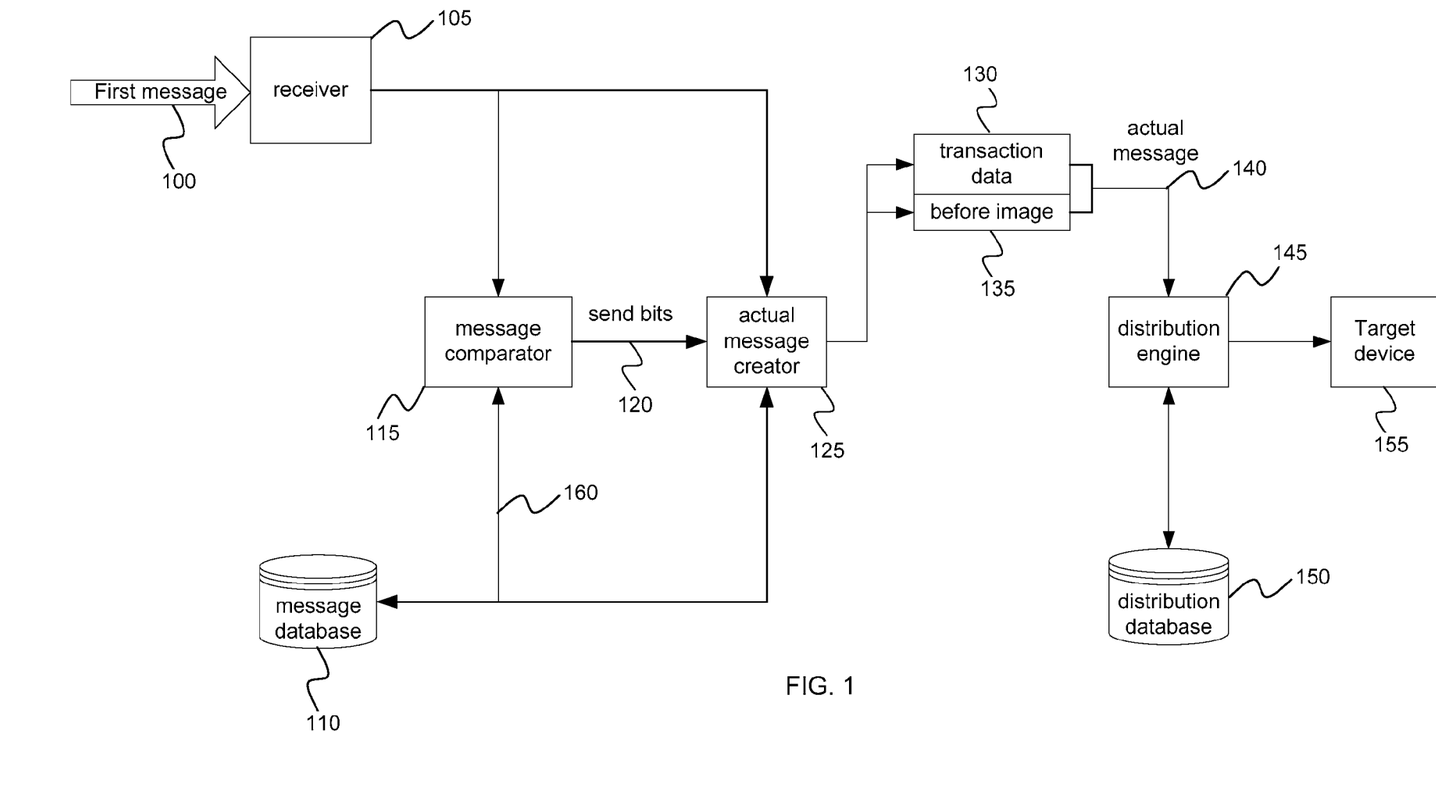
FIG. 1 is a block diagram of a system for identifying an actual message to be updated in a target device according to an embodiment of the invention.

FIG. 1 is a block diagram of a system for identifying an actual message to be updated in a target device according to an embodiment of the invention. The receiver 105 receives a first message 100 and passes it to a message comparator 115. The message comparator 115 compares the first message 100 with a second message 160 in a message database 110. The message database 110 may contain messages that may be distributed to a target device 155. The message comparator 115 compares the first message 100 and the second message 160 and produces the comparison result as send bits 120. The send bits 120 may be sent to an actual message creator 125 for creating an actual message 140. The actual message creator 125 receives the send bits 120 and creates a before image 135 of the first message 100. A transaction data 130 may also be created by the actual message creator 125. The actual message creator 125 may combine the transaction data 130 with the before image 135 to form the actual message 140 that may be updated in the target device 155. The actual message 140 may be sent to a distribution engine 145 which identifies the target device 155 to be updated with the actual message 140 and sends the actual message 140 to the identified target device 155. The distribution engine 145 determines the target device 155 to be updated with the actual message 140 by querying a distribution database 150. The message database 110 may be updated with the actual message 140 after the actual message 140 is determined.

Figure 2:
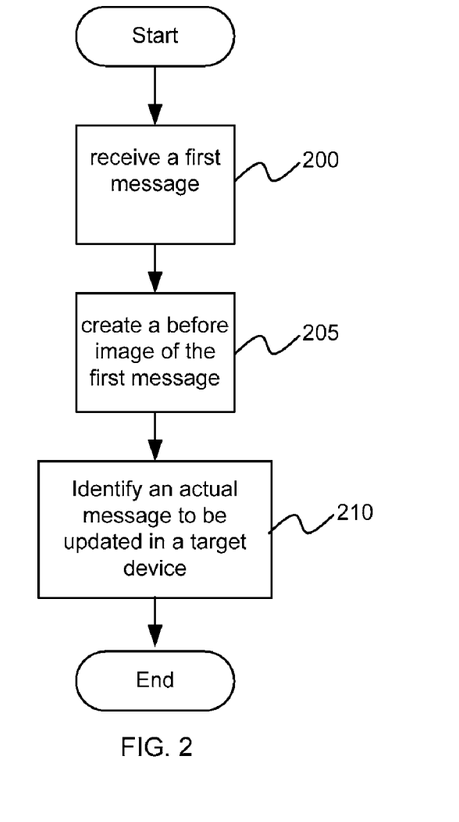
FIG. 2 is a flow diagram to identify an actual message to be updated in a target device according to an embodiment of the invention.

FIG. 2 is a flow diagram to identify an actual message to be updated in a target device according to an embodiment of the invention. Step 200 depicts receiving a first message. Step 205 depicts creating a before image of the first message. The before image of the first message may be created by comparing the first message with a second message in a message database. Every field of the first message may be compared with every field of the second message in the message database to create the before image. Also, a transaction data of the first message is created by comparing the first message with the second message. Step 210 depicts identifying the actual message to be updated in the target device. The actual message to be updated in the target device may be identified by combining the before image and the transaction data of the first message.

In an embodiment, a sales order message may be updated with new values and sent to a server. The server may determine the changes in the sales order message and send the sales order message with the new values to a target device. The target device to be updated with the sale order message may be identified by the server based on a distribution rule. In another embodiment the target device may be a group of target devices.

Figure 3:
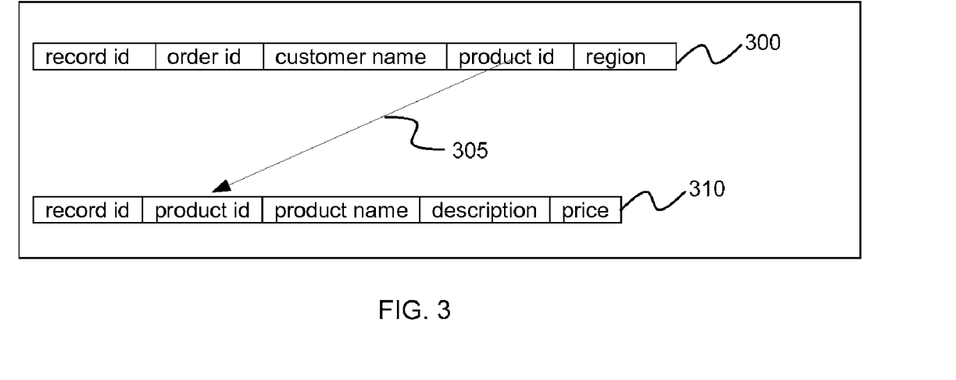
FIG. 3 illustrates structure of a sales order message, a product message and a link between the sales order message and the product message according to an embodiment of the invention.

FIG. 3 illustrates structure of a sales order message, a product message and a link between the sales order message and the product message according to an embodiment of the invention. A message may contain business object instance data, for example, a sales order message may contain sales order business object instance data. A sales order business object instance data may include details like order identification, name of customer to which the sales order belongs to and a list of products in the sales order. The sales order message 300 may have fields that include a record identification (ID), an order ID, customer name, a product ID, and a region to which the sales order belongs. The product message 310 may have fields that include a record ID, product ID, product name, description, and price. The record ID may be a unique key that identifies a message. The sales order message 300 may be linked to the product message 310 via the product ID field as depicted by 305.

Figure 4:
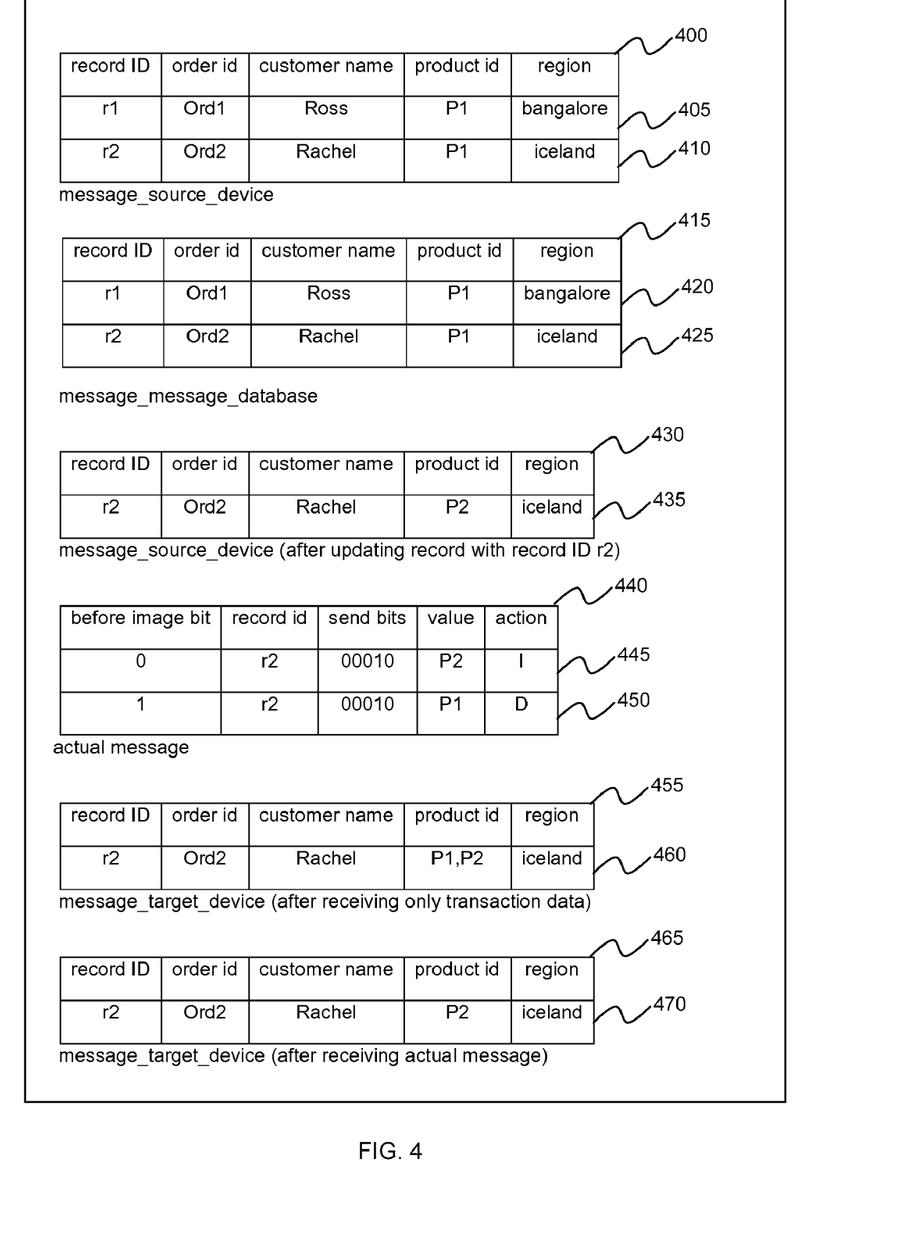
FIG. 4 illustrates an actual message and tables for sales order messages in a source device, message database, and target device according to an embodiment of the invention.

FIG. 4 illustrates an actual message and tables for sales order messages in a source device, message database, and target device according to an embodiment of the invention. The table message_source_device 400 depicts sales order messages 405, and 410 in the source device. The sales orders messages 405, and 410 may be distributed to a target device by a server. The sales orders messages 405, and 410 may be stored as sales order messages 420, and 425 respectively in a message database in the server as depicted by the table message_message_database 415 when the sales orders messages 405, and 410 are distributed to the target device. The message database may contain data of all available products as product messages.

The sales order message 410 in the source device may be updated to have a new product ID, P2 instead of P1 as depicted by first message 435 in table message_source_device 430. The first message 435 having values r2, Ord2, Rachel, P2, and iceland may be sent to a server. The first message 435 may be compared with a second message 425 having a record with record ID r2 stored in a message database in the server to determine the changes in the first message 435. The second message 425 may be an already existing sales order message in the message database which may have been distributed to the target device. After comparing the first message 435 with the second message 425, a comparison result may indicate that the product ID field of the first message 435 has been updated with a new value P2. A transaction data 445 indicating the change in the first message 435 may be created for the first message 435. The transaction data 445 may include a before image bit, record ID of the first message 435, send bits which indicates the field of the first message 435 that may have been changed with respect to the field of the second message 425, value of the field in the first message 435 corresponding to the bit in the send bits with value 1, and action to be performed by the transaction data 445 that include insert (I), delete (D), update (U) and none (N). The before image bit may have values 0 or 1, 0 may indicate that a message may be a transaction data and 1 may indicate that a message may be a before image. The transaction data 445 created may include values 0, r2, 00010, P2 and I for the fields before image bit, record ID, send bits, value, and action respectively. The before image bit with value 0 indicates that the message 445 may be a transaction data. The transaction data 445 may imply that a first message 435 with record ID r2, has been updated with a new value. A field updated with the new value in the first message 435 may be identified by a bit in send bits with value 1. A fourth bit in send bits 00010 is 1 which corresponds to a fourth field, product ID with value P2 in the first message 435. The action I indicates that the new value P2 may be inserted in a sales order with record ID r2 in the target device. The transaction data 445 may not include an instruction to delete the product with product ID P1 from the sales order with record ID r2 in the target device. Thus when the target device is updated with transaction data 445, the sales order with the record ID r2 in the target device may have product P1 and P2 as depicted by 460 in table message_target_device 455. Thus, the sales order message 460 with record ID r2 in the target device may be inconsistent with the sales order message 435 with record ID r2 in the source device. The sales order message 460 with record ID r2 in the target device may have wrong data.

The product to be deleted from the sales order message 435 may be identified by checking all the products in the message database and determining if any product is linked to the sales order message 435. This may be inefficient and slow as there may be a large number of products in the message database.

Thus, a before image 450 of the first message 435 having the instruction to delete product P1 from sales order with record ID r2 may be created. The before image 450 includes values 1, r2, 00010, P1 and D for the fields before image bit, record ID, send bits, value, and action respectively. The before image bit with value 1 indicates that message 450 may be a before image. The record ID field with value r2, the send bits field with value 00010, the value field with P1 and action field with value D imply that in the first message 435 with record ID r2, product ID field with the value P1 that corresponds to the fourth bit with value 1 in send bits 00010 may be deleted from the record with record ID r2 in the target device.

The transaction data 445 may include the instruction to add a new product with product ID P2 to the sales order with record ID r2 in the target device but may not include the instruction to delete the product with product ID P1 from the sales order with record ID r2 in the target device. The before image 450 may include the instruction to delete the product with product ID P1 from the sales order with record ID r2 from the target device but may not include the instruction to add product with product ID P2 to the sales order with record ID r2 in the target device. Thus, an actual message 440 to be updated in the target device is identified by combining the transaction data 445 and the before image 450 of the first message 435. The actual message 440 includes transaction data 445 and the before image 450 that may have the instructions to add the product with product ID P2 and delete the product with product ID P1 from the sales order with record ID r2 in the target device which may result in the sales order message 470 as depicted in table message_target_device 465. Thus, the sales order message 470 in the target device is consistent with the sales order message 435 in the source device. The actual message 440 may be sent to a distribution engine that identifies the target device to be updated with the actual message 440.

Figure 5:
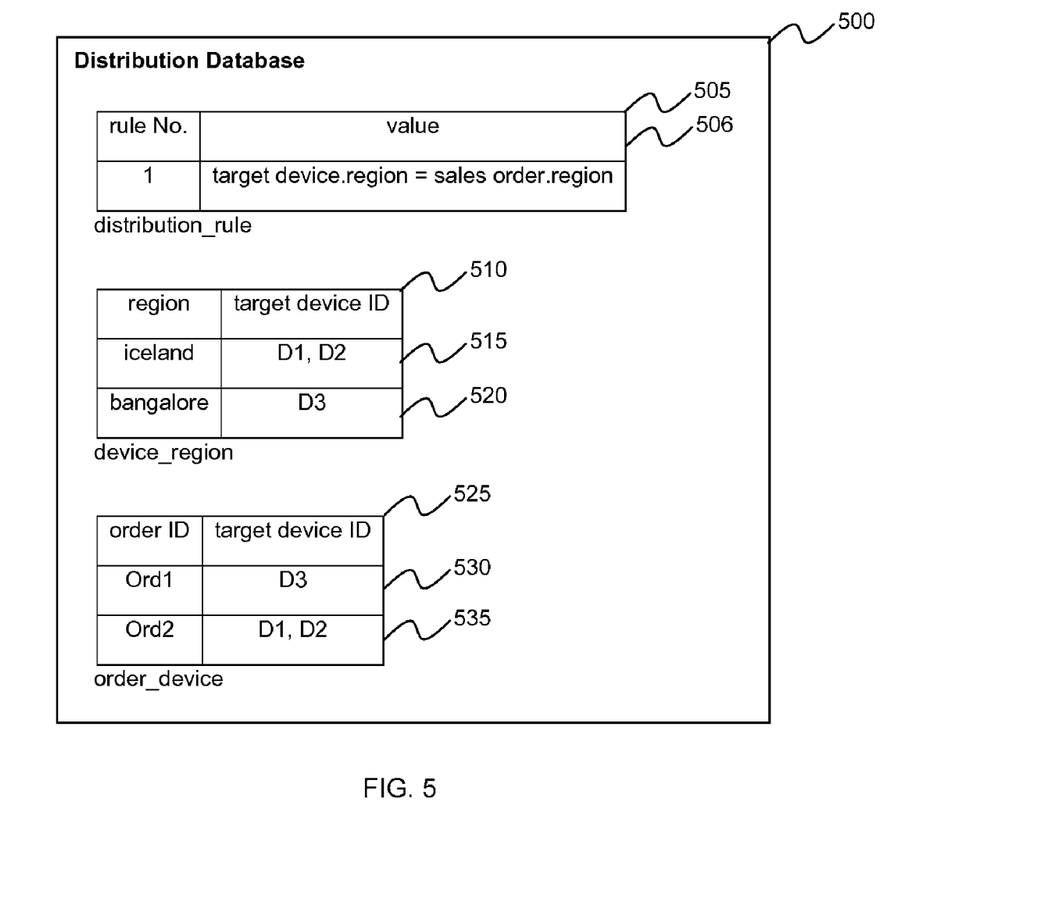
FIG. 5 illustrates tables in a distribution database according to an embodiment of the invention.

FIG. 5 illustrates tables in a distribution database according to an embodiment of the invention. The distribution engine may identify the target device to which the sales orders messages 405, and 410 (as shown in FIG. 4) may be distributed based on a distribution rule specified in the distribution database 500. The distribution database 500 may include tables distribution_rule 505, device_region 510, and order_device 525. In one embodiment, the table distribution_rule 505 may have a distribution rule to distribute a sales order of a particular region to a target device in that region as depicted by distribution rule 506. Thus, when a sales order is sent to the target device, the distribution engine may have to ensure that the sales order is sent to an appropriate target device. Therefore, according to the table message_message_database 415 the sales order message 420 with order ID Ord1 may be sent to the target device in region bangalore. The target device in bangalore is D3 as depicted by 520 in the table device_region 510. Thus, the sales order message 420 with order ID Ord1 may be sent to the target device D3 as depicted by 530 in table order_device 525. The sales order message 410 with order ID Ord2 may be sent to the target devices in region iceland. The target devices in iceland are D1, and D2 as depicted by 515 in the table device_region 510. Thus, the sales order message 410 with order ID Ord2 may be sent to the target devices D1 and D2 as depicted by 535 in table order_device 525. The table order_device 525 may contain a mapping between order ID of the sales order messages 405, 410 and target devices as depicted by 530 and 535.

Figure 6:
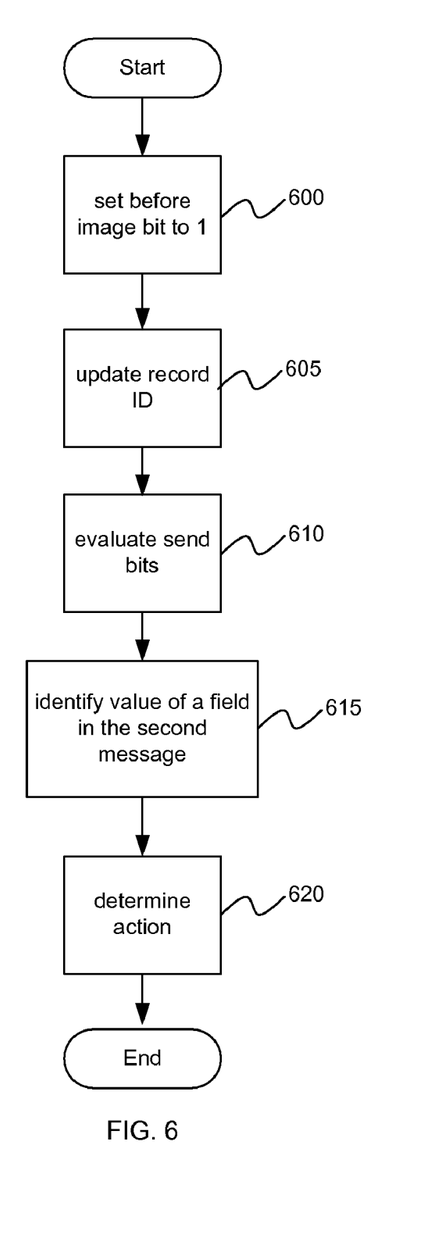
FIG. 6 is a flow diagram for creating a before image of a first message according to an embodiment of the invention.

FIG. 6 is a flow diagram for creating a before image of a first message according to an embodiment of the invention. The before image of the first message may have fields that include before image bit, record ID, send bits, value, and action. The before image bit is set to 1 as depicted by 600 indicating that a message being created is the before image. The record ID may be updated with a record ID of the first message as depicted by 605. The send bits may be evaluated by comparing every field of the first message with every field of a second message as depicted by 610. A bit in the send bits may be set to 0 or 1. The bit in the send bits may be set to 0 if the value of a field corresponding to the bit position in the second message may be same as the value of the respective field in the first message. The bit in the send bits may be set to 1 if the value of a field corresponding to the bit position in the second message may be different from the value of the respective field in the first message. After evaluating the send bits, value of the field in the second message corresponding to the bit in send bits with value 1 may be identified and updated in the value field of the before image as depicted by 615. The action to be taken by the before image in a target device is determined as depicted by 620. The action may include insert, update, delete, and none.

Figure 7:
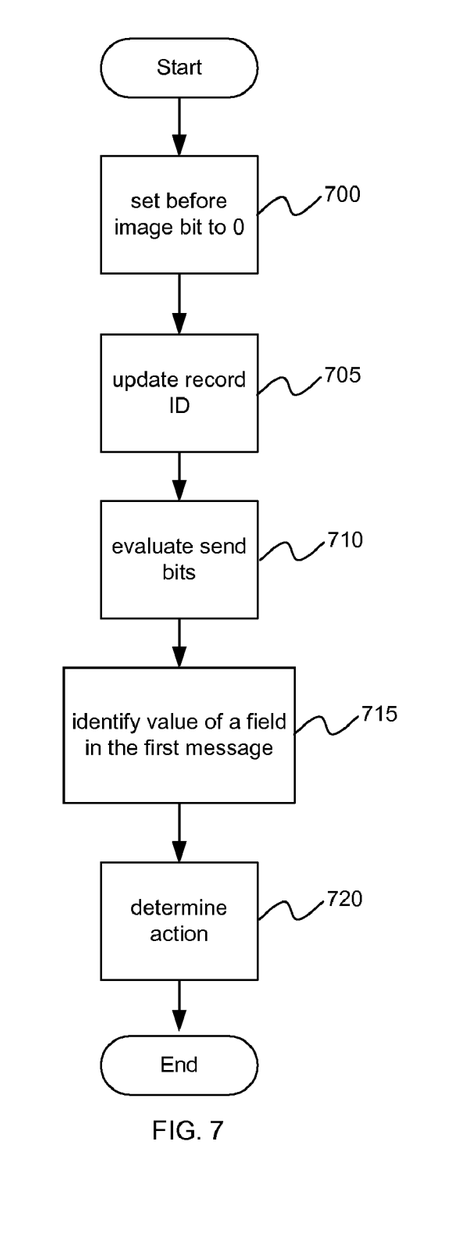
FIG. 7 is a flow diagram for creating a transaction data of a first message according to an embodiment of the invention.

FIG. 7 is a flow diagram for creating a transaction data of a first message according to an embodiment of the invention. The transaction data of the first message may include fields before image bit, record ID, send bits, value, and action. The before image bit may be set to 0 as depicted by 700 indicating that a message being created is the transaction data and not a before image. The record ID may be updated with a record ID of the first message as depicted by 705. The send bits may be evaluated by comparing every field of the first message with every field of a second message as depicted by 710. A bit in the send bits corresponding to a field of the first message may be set to 0 or 1. The bit in the send bits may be set to 0 if the value of a field corresponding to the bit position in the first message may be same as the value of the respective field in the second message. The bit in the send bits may be set to 1 if the value of a field corresponding to the bit position in the first message may be different from the value of the respective field in the second message. After evaluating the send bits, value of the field in the first message corresponding to the bit in send bits with value 1 may be identified and updated in the value field of the transaction data as depicted by 715. The action to be taken by the transaction data in the target device is determined as depicted by 720. The action may include insert, update, delete, and none.

Figure 8:
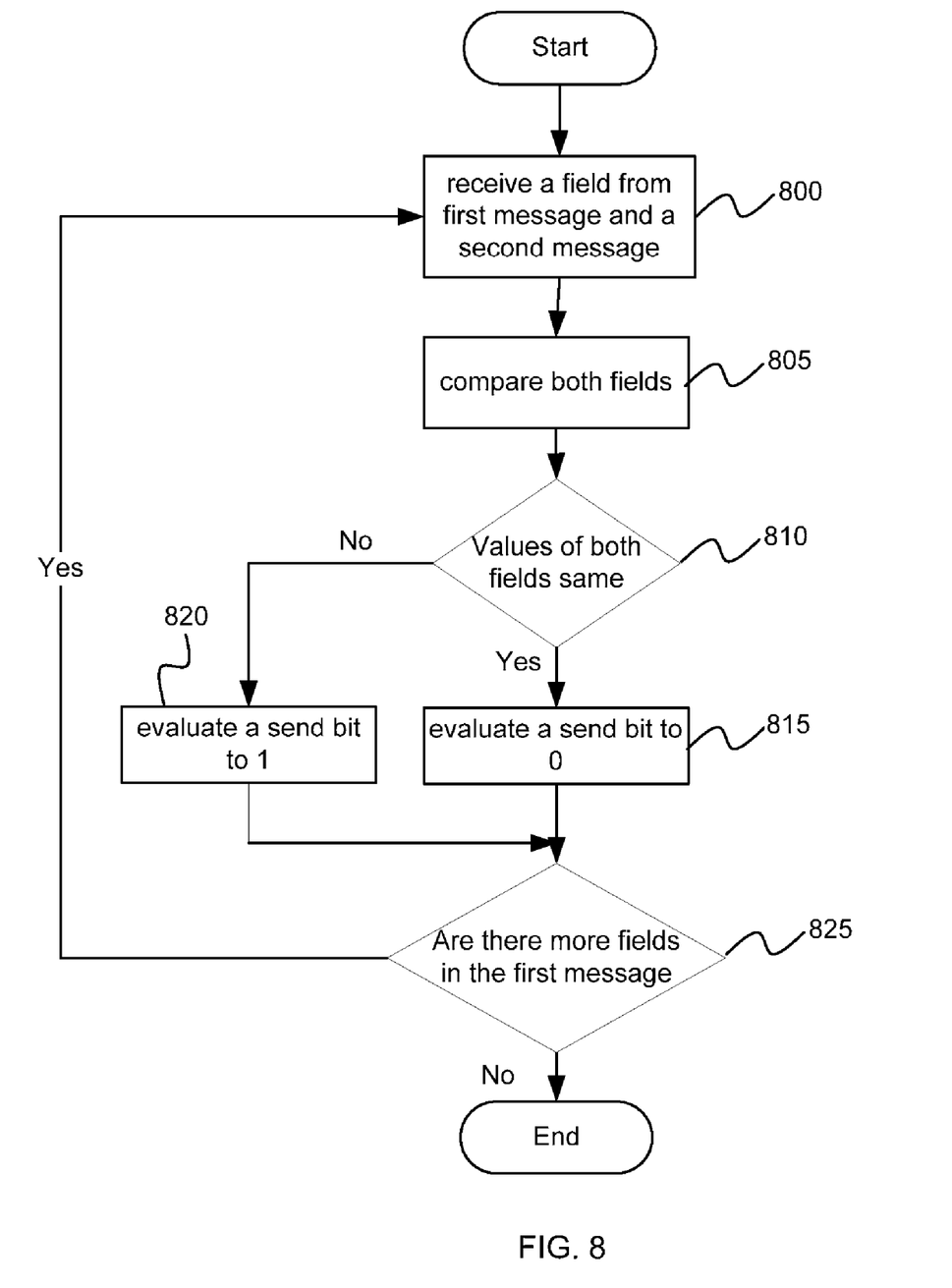
FIG. 8 is a flow diagram for comparing a first message with a second message to produce a comparison result according to an embodiment of the invention.

FIG. 8 is a flow diagram for comparing a first message with a second message to produce a comparison result according to an embodiment of the invention. Step 800 depicts receiving a field from the first message and the second message. The fields of the first message and the second message are compared as depicted by 805 and a check may be made to determine if values of both the fields are same or different as depicted by 810. The comparison result may be produced as send bits. If values of both the fields are same, a bit in the send bits corresponding to the position of the field in the first message may be evaluated to 0 as depicted by 815. If values of both the fields are different, then the bit in the send bits corresponding to the position of the field in the first message may be evaluated to 1 as depicted by 820. The process of receiving the field from the first message and the second message and comparing the values of the fields may be repeated for all the fields in the first message as depicted by 825 and the comparison result may be produced as send bits. Consider an example wherein the first message and the second message have four fields. The four fields in the first message may have values "Rachel, Ross, Chandler, Joey". The four fields in the second message may have values "Monica, Ross, Chandler, Joey". The first message is compared with the second message and the comparison result may determine that first field "Rachel" of the first message and the first field "Monica" of the second message is different. Thus, the first bit in send bits which is a bit corresponding to the first field in the first message being compared is evaluated to 1. The second field "Ross" of the first message is compared with the second field "Ross" of the second message and it is determined that both the fields are same. Thus, the second bit in the send bit corresponding to the second field of the first message is evaluated to 0. Similarly, the third bit and fourth bit may be evaluated to 0 as the third and fourth fields "Chandler, Joey" of the first message are same as the third and fourth fields "Chandler, Joey" of the second message. Thus, the send bits for the first message may be evaluated as "1000".

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. The present invention may be downloaded as a computer program which may be transferred from a remote computer (e.g., a server) to a requesting computer (e.g., a client) by way of a communication link (e.g., a modem or network connection).

Throughout the foregoing description, for the purposes of explanation, numerous specific details were set forth in order to provide a thorough understanding of the invention. It wilt be apparent, however, to one skilled in the art that the invention may be practiced without some of these specific details.

Accordingly, the scope and spirit of the invention should be judged in terms of the claims which follow.

What is claimed is:

1. A computer implemented method of reconciling sales order messages sent to a target device comprising:
   receiving an updated sales order message related to a product;
   identifying, by a processor of the computer, an existing sales order message related to the updated sales order message stored in a message database;
   comparing, by the processor of the computer, the updated sales order message with the existing sales order message to obtain send bits indicating change between the updated sales order message and the existing sales order message;
   generating, by the processor of the computer, an actual message
   comprising a transaction data including at least one action to be performed on the updated sales order message, and a before image of the updated sales order message including at least one other action to be performed on the existing sales order message, wherein the at least one action and the at least one other action are determined based on evaluation of the send bits; and
   sending the actual message to the target device for reconciling the sales order messages sent to the target device.

2. The computer implemented method in claim 1, wherein the updated sales order message comprises business object instance data.

3. The computer implemented method in claim 1, wherein the actual message, the transaction data and the before image comprise fields selected from a group consisting of before image bit, record identification (ID), the send bits, and value of fields corresponding to the send bits and the action.

4. The computer implemented method in claim 1, wherein generating the actual message includes generating the before image, wherein generating the before image comprises:
   setting a before image bit to 1;
   evaluating the send bits; and
   identifying value of a field in the existing sales order message corresponding to a bit in the send bits field with value 1.

5. The computer implemented method in claim 4, wherein evaluating the send bits comprises evaluating every bit of the send bits by comparing every field of the updated sales order message with every field of the existing sales order message.

6. The computer implemented method in claim 1, wherein generating the actual message includes generating the transaction data, wherein generating the transaction data comprises:
   setting a before image bit to 0;
   evaluating the send bits; and
   identifying value of a field in the updated sales order message corresponding to a bit in the send bits field with value 1.

7. The computer implemented method in claim 6, wherein evaluating the send bits comprises evaluating every bit of the send bits by comparing every field of the updated sales order message with every field of the existing sales order message stored in the message database.

8. The computer implemented method in claim 1, wherein identifying the actual message to be updated in the target device further comprises sending the actual message to a distribution engine.

9. The computer implemented method in claim 8, wherein sending the actual message to the distribution engine further comprises identifying the target device to be updated by querying a distribution database with the actual message.

10. A computer system, comprising:
    a processor; and
    a memory coupled to the processor to store program code, the program code comprising:
       a receiver that receives an updated sales order message related to a product;
       a message database that stores the updated sales order message;
       a message comparator that compares the updated sales order message with an existing sales order message, related to the updated sales order message, stored in the message database to provide a message comparison result as send bits indicating change between the updated sales order message and the existing sales order message; and
       an actual message creator that, based on the message comparison result, creates an actual message, comprising a transaction data including at least one action to be performed on the updated sales order message, and a before image of the updated sales order message including at least one other action to be performed on the existing sales order message, to be updated in a target device, wherein the at least one action and the at least one other action are determined based on evaluation of the send bits.

11. The computer system in claim 10, wherein the actual message comprises the transaction data and the before image of the updated sales order message.

12. The computer system in claim 10 further comprises a distribution engine that identifies the target device to be updated with the actual message.

13. The computer system in claim 12 further comprises a distribution database which is queried by the distribution engine to identify the target device to be updated with the actual message.

14. The computer system in claim 13, wherein the distribution database comprises data selected from a group consisting of the first updated sales order message, a distribution rule of the updated sales order message and the target device to which the updated sales order message is sent.

15. An article of manufacture, comprising:
    a machine readable medium having instructions that when executed by a machine cause the machine to:
       receive an updated sales order message related to a product;
       identify an existing sales order message related to the updated sales order message stored in a message database,
       compare the updated sales order message with the existing sales order message to obtain send bits indicating change between the updated sales order message and the existing sales order message;
       generate an actual message comprising a transaction data including at least one action to be performed on the updated sales order message, and a before image of the updated sales order message including at least one other action to be performed on the existing sales order message, wherein the at least one action and the at least one other action are determined based on evaluation of the send bits; and
       send the actual message to the target device for reconciling the sales order messages sent to the target device.

16. The article of manufacture in claim 15, wherein the machine readable medium provides instructions, which when executed by a machine cause the machine to:
   set a before image bit to 1;
   evaluate the send bits; and
   identify value of a field in the existing sales order message corresponding to a bit in the send bits field with value 1.

17. The article of manufacture in claim 16, wherein the machine readable medium provides instructions, which when executed by a machine cause the machine to:
   evaluate every bit of the send bits by comparing every field of the updated sales order message with every field of the existing sales order message.

18. A computer implemented method for reconciling sales order messages sent to target device comprising:
   receiving an updated sales order message corresponding to a product;
   identifying, by a processor of the computer, an existing sales order message related to the updated sales order stored in a message database;
   comparing, by the processor of the computer, the updated sales order message with the existing sales order message to obtain send bits indicating changes between the updated sales order message and the existing sales order message;
   generating, by the processor of the computer, an actual message comprising a transaction data including at least one action to be performed on the updated sales order message, and a before image of the updated sales order message including at least one other action to be performed on the existing sales order message, wherein the at least one action and the at least one other action are determined based on evaluation of the send bits, and wherein generating the actual message includes generating the before image by:
      setting a before image bit to 1;
      evaluating the send bits; and
      identifying value of a field in the existing sales order message corresponding to a bit in the send bits field with value 1; and
   sending the actual message to the target device for reconciling the sales order messages sent to the target device.

19. The computer implemented method in claim 18, wherein evaluating the send bits comprises evaluating every bit of the send bits by comparing every field of the updated sales order message with every field of the existing sales order message.

20. The computer implemented method in claim 18, wherein generating the actual message includes generating the transaction data, wherein generating the transaction data includes:
   setting a before image bit to 0;
   evaluating the send bits; and
   identifying value of a field in the updated sales order message corresponding to a bit in the send bits field with value 1.

21. The computer implemented method in claim 20, wherein evaluating the send bits comprises evaluating every bit of the send bits by comparing every field of the updated sales order message with every field of the existing sales order message stored in the message database.

22. The computer implemented method in claim 18, wherein identifying the actual message to be updated in the target device further comprises sending the actual message to a distribution engine.

23. The computer implemented method in claim 22, wherein identifying the actual message to be updated in the target device further comprises sending the actual message to a distribution engine.

* * * * *